US012675540B2

(12) United States Patent
Jiao

(10) Patent No.: US 12,675,540 B2
(45) Date of Patent: Jul. 7, 2026

(54) CONTENT RETRIEVAL STANDARDIZATION USING GENERATIVE ARTIFICIAL INTELLIGENCE (AI) MODELS

(71) Applicant: Microsoft Technology Licensing, LLC, Redmond, WA (US)

(72) Inventor: Jian Jiao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 13 days.

(21) Appl. No.: 18/895,093

(22) Filed: Sep. 24, 2024

(65) Prior Publication Data

US 2026/0087080 A1 Mar. 26, 2026

(51) Int. Cl.
*G06F 16/9535* (2019.01)
*G06N 3/0475* (2023.01)

(52) U.S. Cl.
CPC ....... *G06F 16/9535* (2019.01); *G06N 3/0475* (2023.01)

(58) Field of Classification Search
CPC .......................... G06F 16/9535; G06N 3/0475
See application file for complete search history.

(56) References Cited

U.S. PATENT DOCUMENTS

| | | | | |
|---|---|---|---|---|
| 2021/0303638 A1* | 9/2021 | Zhong | .................. | G06F 18/231 |
| 2024/0354503 A1* | 10/2024 | Baruch | ................. | G06F 16/345 |
| 2025/0005050 A1* | 1/2025 | Krishnan | ............. | G06F 16/243 |

OTHER PUBLICATIONS

"Phi Silica in the Windows App SDK", accessed on link https://learn.microsoft.com/en-us/windows/ai/apis/phi-silica, Jun. 22, 2024, 4 pages.
"Introducing Apple's On-Device and Server Foundation Models," Machine Learning Research, Retrieved from the URL: https://machinelearning.apple.com/research/introducing-apple-foundation-models, Jun. 10, 2024, 11 Pages.
"LORA: Hugging Face," Retrieved from the URL: https://huggingface.co/docs/peft/developer_guides/lora, retrieved on Aug. 1, 2024, 13 Pages.
Hu, et al., "LoRA: Low-Rank Adaptation of Large Language Models," ICLR, Apr. 22, 2022, 13 Pages.
Hu, et al., "LORA: Low-Rank Adaptation of Large Language Models," In Repository of arXiv:2106.09685v2, Oct. 16, 2021, 26 Pages.
International Search Report and Written Opinion received for PCT Application No. PCT/US2025/036371, mailed on Dec. 3, 2025, 13 pages.
Tan, et al., "QAEA-DR: A Unified Text Augmentation Framework for Dense Retrieval", Retrieved from internet URL : https://arxiv.org/pdf/2407.20207, Jul. 29, 2024, pp. 1-13.

* cited by examiner

*Primary Examiner* — Apu M Mofiz
*Assistant Examiner* — Oscar Wehovz
(74) *Attorney, Agent, or Firm* — Ray Quinney & Nebeker P.C.; Christopher K. Hallstrom

(57) ABSTRACT

A framework for improving the retrieval of content items for user queries using a generative artificial intelligence (AI) model is provided. Specifically, a content retrieval system (e.g., a system for standardizing and retrieving content items) utilizes a generative AI model to standardize user queries and content items into a common object format with normalized values, which improves the accuracy of content retrieval. Additionally, the content retrieval system improves system efficiency by enabling real-time results through a combination of selective online and offline calls to the generative AI model and a distilled encoder neural network.

20 Claims, 9 Drawing Sheets

100

710

CONTENT RETRIEVAL STANDARDIZATION USING GENERATIVE ARTIFICIAL INTELLIGENCE (AI) MODELS

BACKGROUND

In recent years, significant advancements have been made in both the hardware and software domains, particularly in the area of digital content distribution. For example, current content distribution systems are using generative artificial intelligence (AI) models to provide content to users in response to user requests, such as user web searches. However, many current content distribution systems rely heavily on user feedback data, such as user-entered queries, user-selected content items, and user-dwelled websites. While these data sources form the foundation of current content distribution systems and search engines, they also have several limitations that limit the accuracy and efficiency of current systems. For instance, inaccurate results often lead to poor content retrieval and users redoing their searches, which causes inefficiencies that require additional computation resources. As detailed further below, these technical issues, among others, are prevalent in current content distribution systems.

BRIEF DESCRIPTION OF THE DRAWINGS

The following detailed description provides specific and detailed implementations accompanied by drawings. Additionally, each of the figures listed below corresponds to one or more implementations discussed in this disclosure.

DETAILED DESCRIPTION

Figure 1:
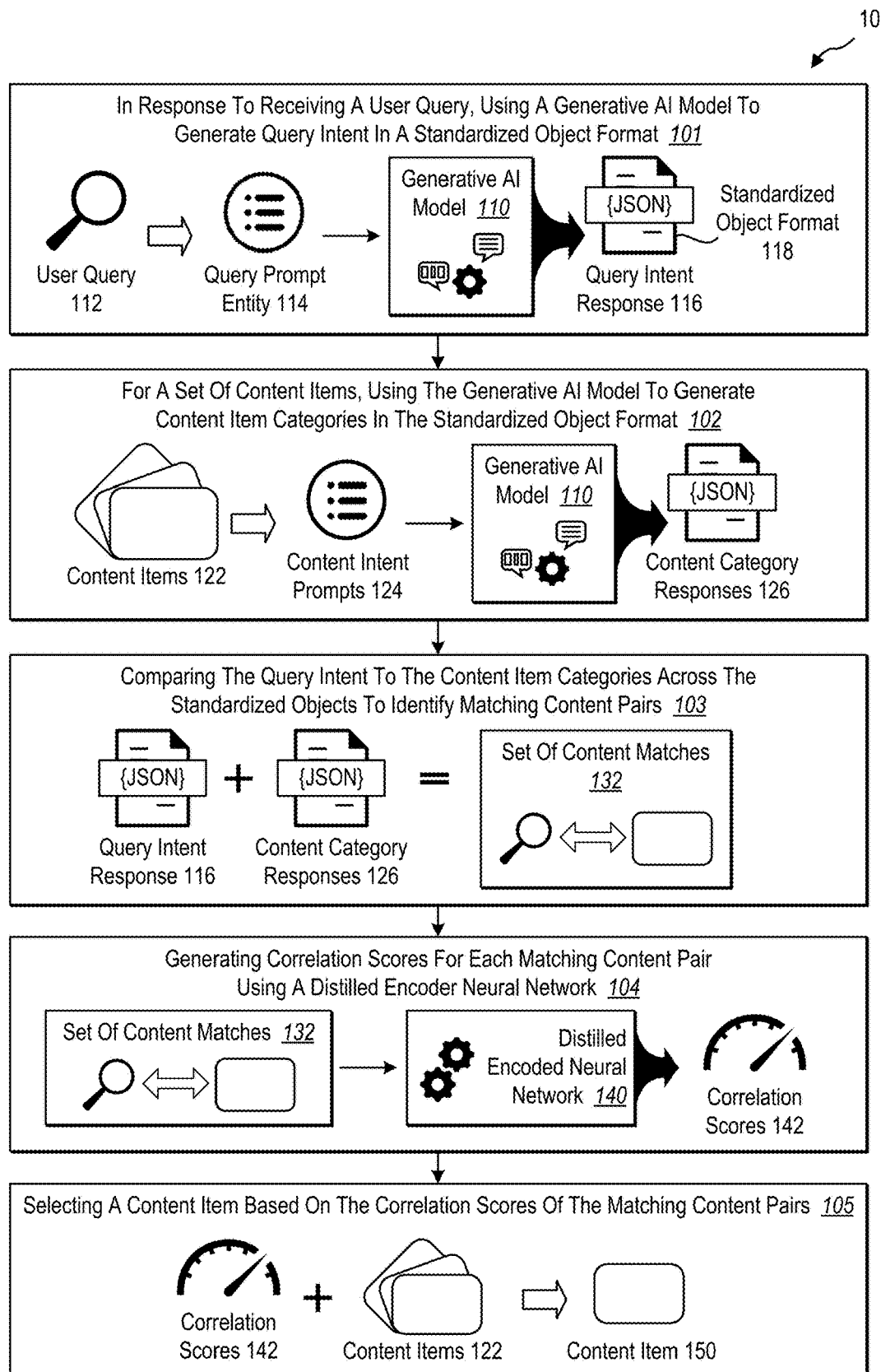
FIG. 1 illustrates an example overview of a content retrieval system that determines relevant content items using online and offline calls to a generative artificial intelligence (AI) model.

This disclosure describes a framework for improving content item retrieval for user queries using a generative artificial intelligence (AI) model. Specifically, this disclosure describes a content retrieval system (e.g., a system for standardizing and retrieving content items) that utilizes a generative AI model to standardize user queries and content items into a common object format with normalized values, which improves content retrieval accuracy. Additionally, the content retrieval system improves system efficiency by enabling real-time results through a combination of selective online and offline calls to the generative AI model and a distilled encoder neural network.

Implementations of the present disclosure provide benefits and address problems in the art with systems, computer-readable media, and computer-implemented methods by utilizing the content retrieval system to determine content items to retrieve in response to a user query. In particular, the content retrieval system utilizes strategic calls to a generative AI model to generate standardized outputs that can be efficiently and accurately compared between user queries and content items. Additionally, the content retrieval system utilizes lightweight neural network models (e.g., a distilled encoded neural network) to rank and determine the most relevant content items for a user query, enabling quick, efficient, and accurate content item retrieval.

To illustrate how the content retrieval system performs content item retrieval based on one or more generative AI models, in one or more implementations, the content retrieval system receives a user query. In response, the content retrieval system generates a query intent prompt with instructions to generate a search query intent based on the user query and user profile information outputted in a standard object format. Additionally, the content retrieval system generates one or more content item prompts with instructions to generate categories of content items outputted in the standard object format (e.g., the same standard object format as the search query intent). Based on receiving a query intent response for the query intent prompt from a generative AI model and receiving one or more content category responses for the one or more content item prompts from the generative AI model, the content retrieval system determines a set of content matches between the user query and the content items. Furthermore, the content retrieval system determines a correlation score for each content match in the set of content matches using a lightweight neural network (e.g., a distilled encoder neural network). The content retrieval system also selects a content item from the content items based on correlation scores.

As mentioned above, current content distribution systems struggle to accurately and efficiently retrieve relevant content items for users in response to user queries. For instance, many current content distribution systems rely heavily on user feedback data, such as user-entered queries, user-selected content items, and user-dwelled websites. As a result, these current systems amass large amounts of data but inefficiently process and use the data, which results in both inefficiencies and inaccuracies when performing content retrieval. For example, many current content distribution systems store data in raw or non-standardized formats. Accordingly, searching and processing the data requires additional processing resources for each user query and often results in poor matches due to data inconsistencies and irregularities.

In contrast, as described in this disclosure, the content retrieval system delivers several significant technical benefits in terms of improved accuracy and efficiency compared to current user query response systems. Furthermore, the content retrieval system provides several practical applications that address problems related to improving the accuracy and efficiency of content item retrieval by selectively using generative AI models and other machine learning models.

To illustrate, the content retrieval system improves the efficiency of the computer system by using a generative AI model to standardize the output formats of content items and user queries to the same standard object format, using normalized values. Because generative AI models are trained across a wide range of concepts and topics, a generative AI model is able to understand input tokens of different scopes and normalize them to a uniform, consistent, homogeneous output. Moreover, the generative AI model can generate these homogeneous output tokens for both content items and user queries. By doing so, the content retrieval system can quickly, accurately, and extremely efficiently compare user queries to content items to determine relevant candidate matches.

Additionally, the content retrieval system can also use the generative AI model to generate outputs for user queries and content items in a standard object format. For instance, the content retrieval system instructs the generative AI model to generate a JSON or other object file format that allows for efficient and accurate value comparison, even across different property fields. By using the same standard object format, the content retrieval system further improves system efficiency and accuracy in determining content items that are highly relevant to a user query.

Furthermore, the content retrieval system improves efficiency by selectively using the generative AI model in both real-time online and offline modes. For example, the content retrieval system performs real-time calls to the generative AI model for user queries as they are received. However, the content retrieval system also performs offline calls to the generative AI model for content items so that resources are saved when a user query is received by not performing online calls for content items.

Moreover, the content retrieval system can improve system efficiency by using a distilled encoded neural network. For instance, while some current systems use a generative AI model to compare content items to user queries, which has a high computational expense that increases with each content item, the content retrieval system uses a lightweight neural network (e.g., a distilled encoded neural network) to determine correlation scores for matching content pairs. This lightweight model can accurately identify the most relevant content item to retrieve in a set of content items while avoiding calling a large language model one or multiple times.

Additionally, the content retrieval system provides improved flexibility over current systems. In particular, by using a generative AI model to normalize value terms from a range of different input types, the content retrieval system allows user queries to be accurately correlated to a broader range of content items. Furthermore, because the content retrieval system converts various inputs (e.g., user profile information and content item categories) to a generative AI model into a standardized object format output, the content retrieval system can efficiently and accurately compare matches regardless of the content provider source of a content item.

As illustrated in the preceding discussion, this disclosure uses a variety of terms to describe the features and advantages of one or more described implementations. For example, this disclosure describes search engine indexing in the context of a cloud computing system. As an example, the term "cloud computing system" refers to a network of interconnected computing devices that provide various services and applications to computing devices (e.g., server devices and client devices) inside or outside of the cloud computing system. An example of a cloud computing system is described below in connection with FIG. 2.

As an example, the terms "user query" and "search query" refer to a request from a client device or system associated with a user that requests a response. In some instances, a web search service provides an interactive interface that includes a query field for a user to provide a user query. In some instances, a user query is inherent based on user interactions with various elements.

As another example, the term "standard object format" refers to a data structure that is uniform across content types and data types. Objects or files that have a standard object format are commonly used for data interchange and storage. The standard object format may include JSON (JavaScript Object Notation), XML (Extensible Markup Language), YAML (YAML Ain't Markup Language), and BSON (Binary JSON). In various implementations, the syntax, properties, and/or values in a standard object are normalized across content types and data types (e.g., normalized based on token outputs from the same generative AI model).

As an example, the term "machine-learning model" refers to a computer model or computer representation that can be trained (e.g., optimized) based on inputs to approximate unknown functions. For instance, a machine-learning model can include (but is not limited to) an autoencoder model, an embedding model, a classification model, a neural network, a decision tree (e.g., a gradient-boosted decision tree), a linear regression model, a logistic regression model, or a combination of these models.

As another example, the term "neural network" refers to a machine learning model made up of interconnected artificial neurons that communicate and learn to approximate complex functions. Neural networks generate outputs based on multiple inputs provided to the model. For instance, a neural network includes an algorithm (or set of algorithms) that uses deep learning techniques and training data to adjust the parameters of the network and model high-level abstractions in data. Compared to generative AI models, machine learning models and neural networks use fewer parameters and are more computationally efficient. There are various types of neural networks including transformer-based neural networks, convolutional neural networks (CNNs), embedding neural networks, residual learning neural networks, recurrent neural networks (RNNs), generative neural networks, generative adversarial neural networks (GANs), and single-shot detection (SSD) networks.

As an example, the term "generative artificial intelligence model" (or "generative AI model") refers to a computational system that utilizes deep learning and a large number of parameters (e.g., billions or trillions for a large version and fewer for a small version) and trained on one or more extensive datasets to produce coherent, contextually relevant, and fluent outputs (e.g., text and/or images) specific to a particular topic. In many cases, a generative AI model is an advanced computational system that uses natural language processing, machine learning, and/or image processing to generate human-like responses that are coherent and contextually relevant. For instance, generative AI models can create outputs in various formats, including one-word answers, long narratives, images, videos, labeled datasets, documents, tables, and presentations.

Moreover, generative AI models are primarily based on transformer architectures for understanding, generating, and manipulating human language. Generative AI models can also utilize other types of architectures such as recurrent neural network (RNN) architecture, long short-term memory (LSTM) model architecture, convolutional neural network (CNN) architecture, or other types of architectures. Examples of generative AI models include generative pre-trained transformer (GPT) models like GPT-3.5, GPT-4, and GPT-40, bidirectional encoder representations from transformers (BERT) models, text-to-text transfer transformer models like T5, conditional transformer language (CTRL) models, and Turing-NLG. Other types of generative AI models include sequence-to-sequence models (Seq2Seq), vanilla RNNs, and LSTM networks. In some instances, a generative AI model includes a large language model (LLM), a small language model (SLM), a large action model (LAM), and a small action model (SAM), which serve as text-based versions of a generative AI model, such as those that receive text prompts and/or generate text outputs. In various implementations, a generative AI model is a multi-modal generative model that receives multiple input formats (e.g., text, images, video, data structures) and/or generates multiple output formats.

As another example, the terms "prompt" and "model prompt" refer to a request provided to a generative AI model to create generative AI model output based on plain language guidance inputs. Examples of prompts include query intent prompts, content item prompts, correlation score prompts, or other generative model prompts, which are further described below.

In some instances, various prompts are provided to a generative AI model. In some implementations, a prompt can include higher-level information and meta-level information to provide important contextual information and/or general framing information to a generative AI model. For example, the content retrieval system generates and provides a meta-prompt that includes responsible AI (RAI) considerations.

Implementation examples and details of the content retrieval system (e.g., a model inconsistency bias mitigation system) will be discussed in connection with the accompanying figures, which will be described next. For example, FIG. 1 illustrates an example of a content retrieval system that determines relevant content items using online and offline calls to a generative artificial intelligence (AI) model according to some implementations. While FIG. 1 provides a high-level overview of the invention, additional details are provided in subsequent figures.

FIG. 1 illustrates a series of acts 100 performed by or in connection with the content retrieval system. As shown, the series of acts 100 briefly illustrates an example of how the content retrieval system uses a generative AI model to generate normalized data within standardized objects as part of determining which content items to retrieve in response to a user query.

The series of acts 100 includes act 101 of using a generative AI model, in response to receiving a user query, to generate query intent in a standardized object format. For instance, the content retrieval system identifies a user query 112 from a client device of a user and in response, generates a query entity prompt 114 with instructions for the generative AI model 110 to generate a search query intent based on the user query and, in some instances, user profile information. The query entity prompt 114 may also direct the generative AI model 110 to output a query intent response 116 in a standardized object format 118 with normalized value terms. In various implementations, the content retrieval system uses the generative AI model 110 to generate a query intent response 116 in real time upon receiving a user query 112.

Act 102 includes using the generative AI model to generate content item categories in the standardized object format for a set of content items. For example, for a set of content items 122, the content retrieval system generates one or more content intent prompts 124 with instructions for the generative AI model 110 to generate content category responses 126 also in the standardized object format 118 with normalized value terms. In various implementations, the content retrieval system provides the content item and associated metadata to the generative AI model 110 when providing the content intent prompts 124. The content category responses 126 can indicate the categories, attributes, and benefits of a content item. In various implementations, the content retrieval system generates the content category responses 126 offline.

Act 103 includes comparing the query intent to the content item categories across the standardized objects to identify matching content pairs. For instance, the content retrieval system identifies similar or matching values between the query intent response 116 and the content category responses 126. Because both the user query and the content items have been normalized value terms, the content retrieval system can quickly identify the same or similar values between the user query and one or more content items. For each match, the content retrieval system includes it in a set of content matches 132.

Act 104 includes generating correlation scores for each matching content pair using a distilled encoder neural network. In various implementations, the content retrieval system provides the set of content matches 132 to a distilled encoder neural network 140, which generates and outputs correlation scores 142 for each pair. In one or more implementations, the content retrieval system trains and updates the distilled encoder neural network 140 using the generative AI model 110, as described below. Using the correlation scores 142, the content retrieval system can rank the content items within the set of content matches 132.

Act 105 includes selecting a content item based on the correlation scores of the matching content pairs. For instance, upon identifying the top one or more ranked matching content pairs, the content retrieval system selects the content items in these pairs to provide to the user. For example, the content retrieval system selects a content item 150 from the highest-ranked matching pair to be provided to the client device associated with the user in response to the user query 112.

In some implementations, the content items correspond to search results. For example, a content item corresponds to a website or website link. In some instances, the content items include images or other media. In various implementations, the content items include ads to be provided to users along with search results. In one or more implementations, the content items are files or documents for which users are searching.

Figure 2:
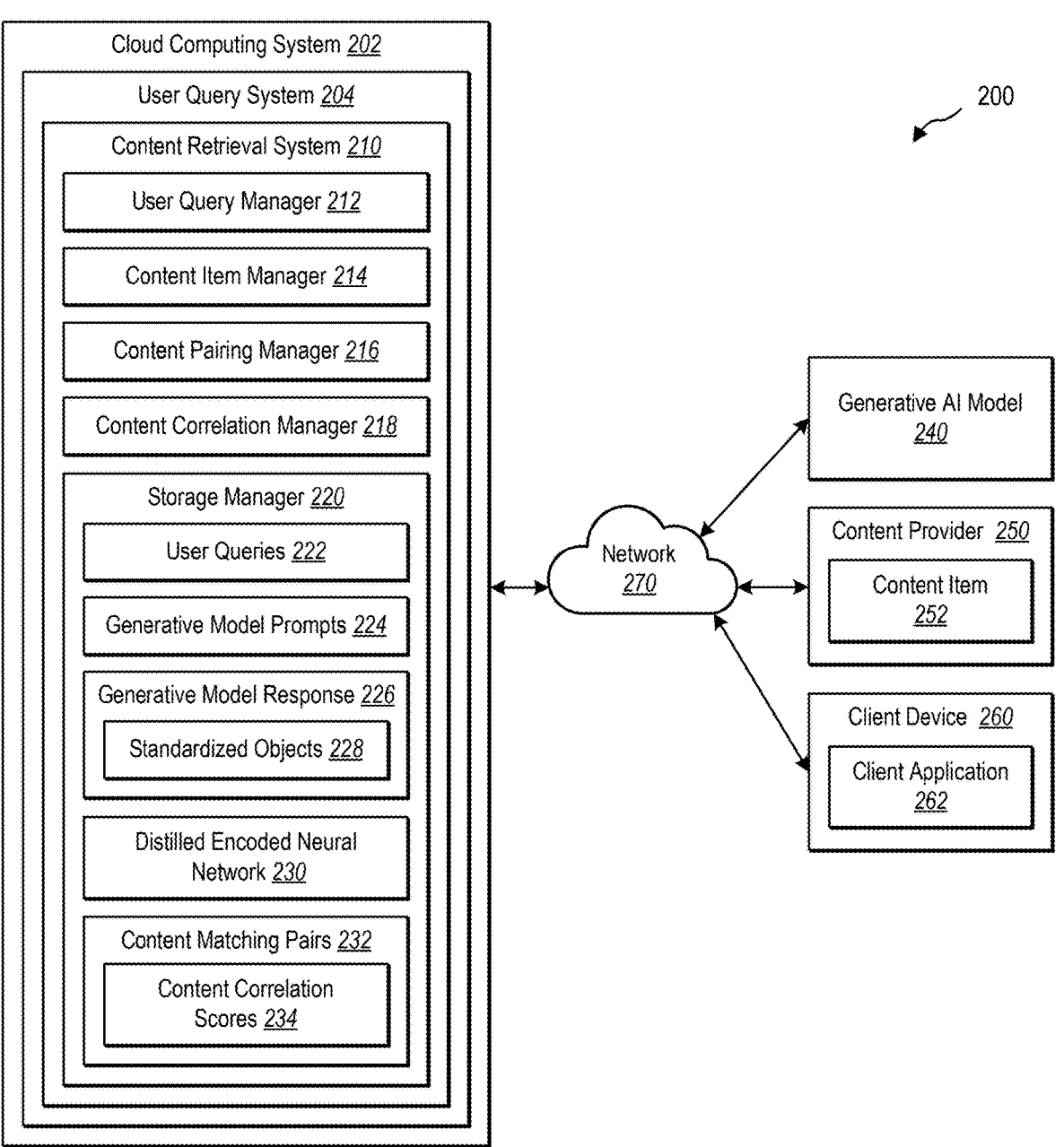
FIG. 2 illustrates an example computing environment in which the content retrieval system is implemented.

With a general overview in place, additional details are provided regarding the components, features, and elements of the content retrieval system. To illustrate, FIG. 2 shows an example computing environment where the content retrieval system is implemented according to some implementations. In particular, FIG. 2 illustrates an example of a computing environment 200 with various computing devices including a cloud computing system 202 associated with a content retrieval system 210, a generative AI model 240, a content provider, and a client device 260, connected via a network 270. While FIG. 2 shows example arrangements and configurations of the computing environment 200, the cloud computing system 202, the content retrieval system 210, and associated components, other arrangements and configurations are possible.

Some of the components shown may be implemented on one or more computing devices, such as one or more server devices. In various implementations, some of these components (e.g., the cloud computing system 202, the generative AI model 240, the content provider 250, and the client device 260) represent multiple component instances or component versions. Further details regarding computing devices are provided below in connection with FIG. 9, which also includes additional details regarding networks, such as the network 270 shown.

Before describing the components of the cloud computing system 202, including the content retrieval system 210, other components of the computing environment 200 are discussed first to provide better context when describing the content retrieval system 210. For example, the generative AI model 240 represents one or more generative models. The generative AI model 240 may produce generative outputs (e.g., AI model outputs) based on prompt inputs (e.g., AI model prompts). For instance, the generative AI model 240 generates responses to user or system prompts. In various implementations, the generative AI model 240 generates responses in a standardized object format.

The computing environment 200 includes a content provider 250. In various implementations, the content provider 250 provides content, such as webpages, media, ads, documents, or other content (e.g., shown as content items 252). Often, the content provider 250 provides content items 252 associated with user queries. The content provider 250 may represent a wide variety of content providers and/or content distribution systems. In some instances, the content provider 250 is integrated within the cloud computing system 202.

As shown, the computing environment 200 includes the client device 260 with a client application 262. In various instances, the client device 260 includes a client application 262, such as a web browser, mobile application, or another type of computer application used to provide user queries for content. In various implementations, the client device 260 is associated with a user (e.g., a user client device), such as a user who regularly engages in user queries (e.g., web searches) using the client application 262.

Returning to the cloud computing system 202, as shown, the cloud computing system 202 includes a user query system 204. The user query system 204 facilitates user queries about topics or content where query results are provided in response to the user queries. For example, the user query system 204 is part of a web search engine, a content search system, an ad serving system, and/or a document management system. As shown, the user query system 204 includes the content retrieval system 210.

In some implementations, the content retrieval system 210 is located on a separate computing device from the user query system 204 within the cloud computing system 202 (or apart from the cloud computing system 202). In various implementations, the content retrieval system 210 operates independently of the user query system 204.

In various implementations, including the illustrated implementation, the content retrieval system 210 includes various components and elements implemented in hardware and/or software. For example, the content retrieval system 210 includes a user query manager 212, a content item manager 214, a content pairing manager 216, a content correlation manager 218, and a storage manager 220. The storage manager 220 includes user queries 222, generative model prompts 224, generative model responses 226, standardized objects 228, a distilled encoder neural network 230, and content matching pairs 232 with content correlation scores 234.

In one or more implementations, the user query manager 212 manages user queries 222, query intent prompts (e.g., generative model prompts 224), and query intent responses (e.g., generative model responses 226). For example, the user query manager 212 obtains user queries received from the client device 260. In some implementations, the user query manager 212 may generate query intent prompts based on the user queries 222, provide the query intent prompts to the generative AI model 240, and receive query intent responses (e.g., generative model responses 226). In various implementations, the user query manager 212 generates query intent prompts that direct the generative AI model 240 to provide responses as standardized objects 228 (e.g., JSON or other file types).

In various implementations, the content item manager 214 generates content item prompts (e.g., generative model prompts 224) and receives content category responses (e.g., generative model responses 226) in connection with the generative AI model 240. For example, the content item manager 214 obtains content items 252, such as from the content provider 250. In some implementations, the user query manager 212 may generate content item prompts based on the content items 252, provide the content item prompts to the generative AI model 240, and receive content category responses (e.g., generative model responses 226). In various implementations, the content item manager 214 generates content item prompts that direct the generative AI model 240 to provide responses as standardized objects 228 (e.g., JSON or other file types).

In one or more implementations, the content pairing manager 216 determines content matching pairs 232 between user queries 222 and content items 252. For example, the content pairing manager 216 identifies correlations, matches, and/or similarities between a query intent response for a user query and content category responses for content items. When a content item shares one or more similarities with the user query, the content pairing manager 216 may add the content item to a set of content matching pairs 232.

In various implementations, the content correlation manager 218 determines content correlation scores 234 for content matches within the content matching pairs 232. In various implementations, the content correlation manager 218 utilizes a distilled encoder neural network 230 to determine content correlation scores 234. In various implementations, the content correlation manager 218 facilitates training, tuning, and updating the distilled encoder neural network 230. In some implementations, the content correlation manager 218 can identify top-rated content items for a user query based on the content correlation scores 234 and retrieve them from the content provider 250 to provide to the client device 260 in response to a user query.

Turning to the next set of figures, these figures illustrate examples of the content retrieval system 210 performing different parts of the framework for improving content item retrieval for user queries using a generative artificial intelligence (AI) model. In particular, FIG. 3 provides an overview of the framework while FIGS. 4, 5, 6, 7A, and 7B additional details about the framework.

Figure 3:
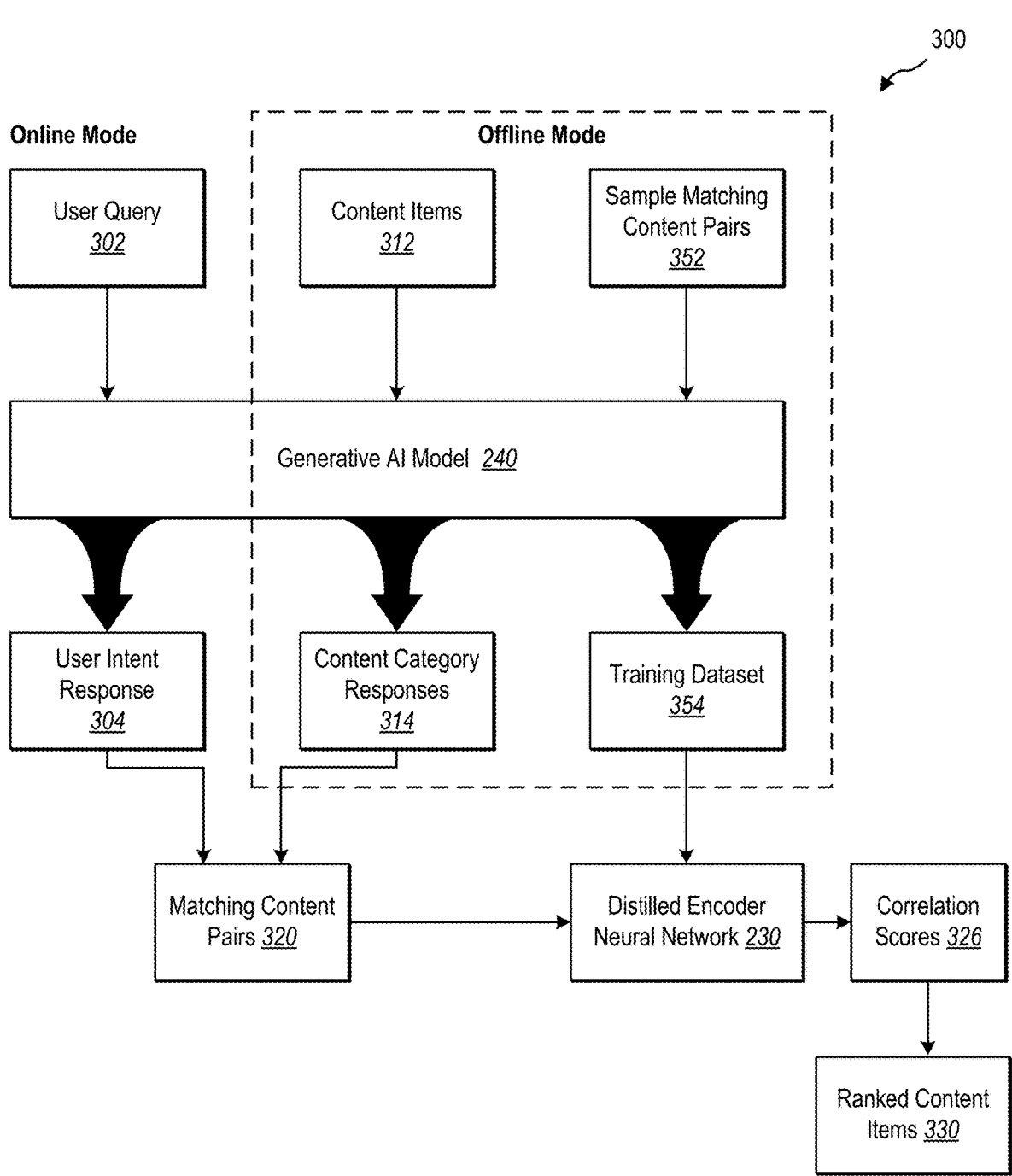
FIG. 3 illustrates an example overview of the content retrieval system performing various operations using a generative artificial intelligence (AI) model.

As mentioned, FIG. 3 illustrates an example overview of the content retrieval system performing various operations using a generative artificial intelligence (AI) model according to some implementations. As shown, FIG. 3 includes a framework 300 of the content retrieval system 210 using the generative AI model 240 at various stages or phases to determine or generate ranked content items.

To illustrate, the framework 300 includes the content retrieval system 210 receiving a user query 302 and providing it to the generative AI model 240 to generate a user intent response 304, which includes normalized terms to characterize the user query and intents included in the query. As shown, the content retrieval system 210 can use the generative AI model 240 to generate the user intent response 304 in real-time (e.g., in online mode). Additionally, the content retrieval system 210 can direct the generative AI model 240 to generate the user intent response 304 in a standardized object format, such as a JSON file of properties and values. Additional details about generating user intent responses are provided below in connection with FIG. 4.

The framework 300 also includes the content retrieval system 210 identifying content items 312 and providing them to the generative AI model 240 to generate content category responses 314. The content category responses 314 can include categorizations of the content items, as well as characteristics, attributes, and/or benefits of the content items annotated in normalized terms. Additionally, the content retrieval system 210 can direct the generative AI model 240 to generate the content category responses 314 in a standardized object format, such as a JSON file of properties and values.

As shown, the content retrieval system 210 can generate the content category responses 314 offline (e.g., in offline mode). For example, the content retrieval system 210 generates the content category responses 314 before receiving user queries. Furthermore, the content retrieval system 210 can store the standardized objects that include the content category responses 314 in a data store for later access, analysis, and comparison. By generating the content category responses 314 offline, the content retrieval system 210 can reduce processing when the generative AI model 240 is in low demand. Additionally, because generating the content category responses 314 may require a significant or sizable amount of time to process (depending on the number of content items), the content retrieval system 210 can route model processing before a user query is received rather than causing a user to wait an undue amount of time to process content items in real time. Additional details about generating content category responses are provided below in connection with FIG. 5.

As shown, the framework 300 includes the content retrieval system 210 generating matching content pairs 320 from the user intent response 304 and the content category responses 314. For example, in connection with the real-time operations of generating the user intent response 304 for the user query 302, the content retrieval system 210 can compare the user intent response 304 to previously generated content category responses to identify the matching content pairs 320. Additional details about generating matching content pairs are provided below in connection with FIG. 6.

Additionally, the framework 300 includes the content retrieval system 210 providing the matching content pairs 320 to the distilled encoder neural network 230, which generates correlation scores 326. For example, the distilled encoder neural network 230 processes each matching content pair to determine a correlation score between the user query 302 and the content item within the matching content pair. Using the matching content pairs 320, the content retrieval system 210 can determine which content item to select. Based on the correlation scores 326, the content retrieval system 210 can determine ranked content items 330.

In various implementations, the content retrieval system 210 generates and/or trains the distilled encoder neural network 230. For instance, the framework 300 includes the content retrieval system 210, which provides sample matching content pairs 352 to the generative AI model 240 to generate a training dataset 354. With the training dataset 354, in various implementations, the content retrieval system 210 trains the distilled encoder neural network 230 to generate correlation scores. Additional details about training and using a distilled encoder neural network to generate correlation scores for matching content pairs are provided below in connection with FIGS. 7A and 7B.

As previously mentioned, generative AI models are commonly pre-trained on massive text corpora to generate and output coherent and informative text narratives. Generative AI models can also consistently perform reasoning tasks and produce outputs with normalized values. By using the same or similar generative AI model for each part of the framework 300, the content retrieval system 210 ensures that the values and terms within the outputs are normalized to the same terms and meanings.

To elaborate, because the generative AI model 240 was trained on a vast breadth of knowledge and examples, it can recognize different terms with the same semantics or meanings, as well as similar terms with different meanings. The generative AI model can then create normalized tokens that not only have similar semantic meanings but also have the same plain-faced meanings. As an analogy, the generative AI model can convert inputs in different languages to the same language and ensure that the outputs are in the same dialect. This way, the properties, values, and terms provided by the generative AI model, in response to its reasoning and analysis, are consistent and comparable, even if the inputs are semantically mismatched.

As mentioned above, FIG. 4 provides additional details about generating user intent responses. In particular, FIG. 4 illustrates an example sequence diagram for determining the user intent of a user query using the generative artificial intelligence (AI) model according to some implementations.

Figure 4:
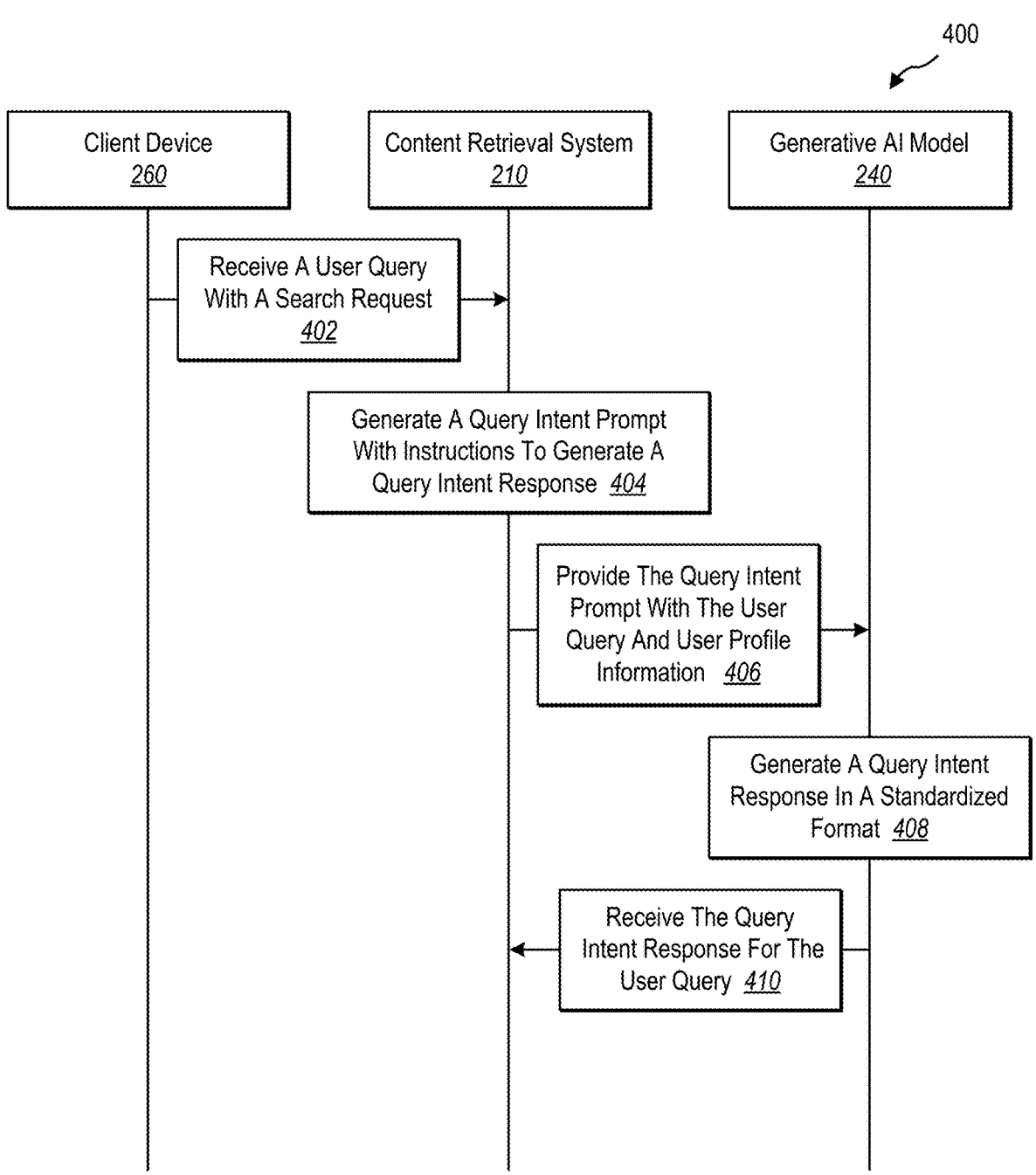
FIG. 4 illustrates an example sequence diagram for determining the user intent of a user query using the generative artificial intelligence (AI) model.

FIG. 4 includes various components that communicate with each other to generate user intent responses to user queries. As shown, FIG. 4 includes the content retrieval system 210, the generative AI model 240, and the client device 260, which were introduced above. Additionally, FIG. 4 includes a series of acts 400 performed by or with the content retrieval system 210. As indicated above, the content retrieval system 210 may perform operations in the series of acts 400 in real time upon receiving a user query.

As shown, the series of acts 400 includes act 402 of the content retrieval system 210 receiving a user query with a search request from the client device 260. For instance, a user provides a user query for content to a user query system. For example, the user provides the user query with user input of "best laptop for gaming." In response, the content retrieval system 210 identifies and/or receives the user query.

Act 404 includes generating a query intent prompt with instructions to generate a query intent response. In various implementations, the content retrieval system 210 generates a query intent prompt (e.g., a generative prompt) to obtain the intent of the user query using the generative AI model. For example, the query intent prompt includes the user query and instructions to generate a search query intent based on the user query outputted in a standardized object format. In various implementations, the query intent prompt also provides user profile information that the generative AI model may use as a retrieval augmented generation (RAG) tool to better determine the intent of the user query.

To elaborate, in one or more implementations, the instructions direct the generative AI model 240 to generate natural language text representative of user intent and user preferences. For example, the prompt states "Given the user query and the user profile, generate natural language texts that represent the user's intent and preferences in JSON format."

In some instances, the instructions direct the generative AI model 240 to provide output in a standardized object format, such as a JSON file. In various implementations, the query intent prompt includes an example of a user query output generated in the standardized object format. For instance, Listing 1 below shows an example of text included in the query intent prompt that provides an example output to the generative AI model 240.

> For example, for the query "best laptop for gaming," the user's intent and preferences can be represented as a JSON object file:

```
{
    "intent": "laptop",
    "sub-intent": ["gaming"],
    "preferences": {
        "performance": "high",
        "graphics": "good",
        "price": "reasonable"
    }
}
```

Listing 1

In various implementations, the content retrieval system 210 can use the standardized object, which captures the user's needs and preferences, as a feature vector for the user query.

As mentioned above, the content retrieval system 210 may include user profile information in the query intent prompt. In various implementations, the content retrieval system 210 obtains user profile information from another system, such as the user query system or a user profile system. In some implementations, the content retrieval system 210 stores, with permission from the user, pieces of user information of the user that provided the user query, such as demographic information, online activity, and user-indicated preferences.

For instance, Listing 2 below includes an example of user profile information, where some or all may be provided with the query intent prompt.

```
# user profile:
{
    "profile":
        {"age": 25,
        "gender": "male",
        "location": "New York",
        "browsing_history": [
            {
            "web title": "PC-i7-Dual-Channel-XD",
            }
        ]
        }
        "search": ["extended stay hotels las vegas", "las
            vegas shows", "las
        vegas", "southwest airlines official site", "las vegas
            shows",
        "resorts world las vegas concerts schedule"],
        "uet": ["Explore Edge", "Search Results Extended",
            "Special Offers and Hotel", "Maternity Leave
            Laws by State", "Concert Tickets Box Off",
            "Country Music Tickets"],
        "edge": [" "]
    }
}
```

Listing 2

In some implementations, the query intent prompt can direct the generative AI model 240 to rely on the user profile information when the user query is too vague to infer user intent. By doing so, when a user query is too general, the generative AI model 240 can use the more specific information from the user profile to identify the user's intent of the user query.

Act 406 includes the content retrieval system 210 providing the query intent response with the user query and the user profile information to the generative AI model 240. In response, the generative AI model generates a query intent response in a standardized format, as shown in act 408. As mentioned earlier, in various implementations, the generative AI model 240 incorporates user profile information to further refine the user's preferences and needs. Additionally, as provided above, not only does the generative AI model 240 provide a query intent response in a standardized object format (e.g., a JSON object file), but the properties and values within the object are normalized terms.

Act 410 includes the content retrieval system 210 receiving the query intent response from the generative AI model 240. For instance, upon generating the query intent response, the generative AI model 240 provides the standardized object to the content retrieval system 210. The content retrieval system 210 may use the standardized object indicating the user query intent for comparison to content items, which is described below in connection with FIG. 6.

As mentioned above, FIG. 5 includes additional details about generating content category responses. In particular, FIG. 5 illustrates an example sequence diagram for determining content item categories using the generative artificial intelligence (AI) model according to some implementations.

Figure 5:
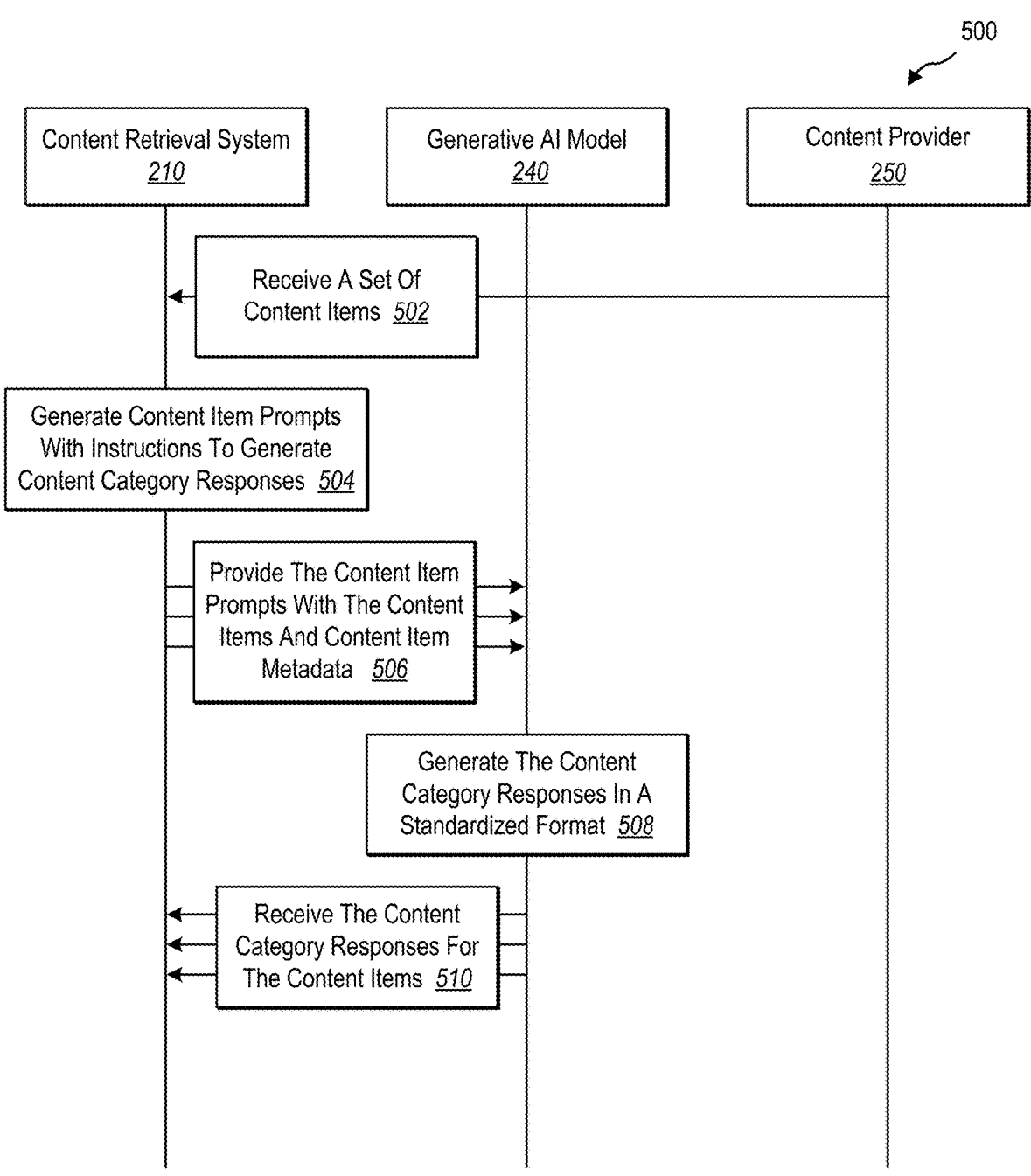
FIG. 5 illustrates an example sequence diagram for determining content item categories using the generative artificial intelligence (AI) model.

FIG. 5 includes the content retrieval system 210, the generative AI model 240, and the content provider 250 communicating with each other. Additionally, FIG. 5 includes a series of acts 500 performed by or with the content retrieval system 210. As indicated above, the content retrieval system 210 may perform operations in the series of acts 500 offline, such as when there is low demand for the generative AI model.

Act 502 includes the content retrieval system 210 receiving a set of content items from the content provider 250. For example, the content retrieval system 210 identifies a set of one or more content items from the content provider 250, where the content provider 250 maintains content items to be provided to users in response to user queries. As mentioned above, the set of content items can include webpages, media, ads, documents, or other content.

In response to receiving and/or identifying content items, the content retrieval system 210 generates content item prompts with instructions to generate content category responses, as shown in act 504. In various implementations, the content retrieval system 210 generates a content item prompt (e.g., a generative prompt) for the generative AI model 240 to process multiple content items. In some implementations, the content retrieval system 210 generates a content item prompt for each content item provided to the generative AI model 240 for processing. In various implementations, the content retrieval system 210 generates a query intent prompt to obtain and/or extract the categories, attributes, benefits, and/or qualities of content items. In various implementations, the content retrieval system 210 includes a given content item, metadata, and/or related content with a content item prompt. By doing so, the content item prompt may include additional data for the generative AI model 240 to use as a retrieval augmented generation tool to better determine the specifics of a given content item.

In some implementations, the instructions in the content item prompt direct the generative AI model 240 to generate natural language text representative of a content item category and content item attributes of a given content item. Indeed, the content item prompt guides or directs the generative AI model 240 to determine and provide an understanding of a given content item. Then, using the same generative AI model used for the user query, the model can output properties and values of the content items using the normalized values and terms.

In various implementations, the instructions in the content item prompt direct the generative AI model 240 to generate one or more content category responses in the standardized object format. For example, the content item prompt guides or directs the generative AI model 240 to provide output in the same standardized object format that matches the format of the user intent response (e.g., a JSON object). In some implementations, the content item prompt includes an example output of a content category response in the standardized object format.

As mentioned above, in various implementations, the content item prompt for a given content item includes metadata and/or related content for the content item. For example, if the content item is a link to the content (e.g., a search result link or snippet), the content item prompt can also include the linked content (e.g., the content of the webpage). If the content item is an ad, the content item prompt can include additional information about the product or service referenced in the ad. If the content item is a document, the content of the document may also be provided. Additionally, metadata information about the content item can also be provided in the content item prompt for a given content item. In some implementations, the content item prompt does not include metadata and/or additional content beyond the content item itself or a reference or link to the content item.

Act 506 includes the content retrieval system 210 providing the content item prompts with the content items and content item metadata to the generative AI model 240. In response, the generative AI model 240 generates the content category responses in a standardized format, as shown in act 508. For example, the generative AI model 240 receives a content item prompt that states "Given the content item and content item metadata, generate natural language texts that represent the content item's category, attributes, and benefits in JSON format." Additionally, the content item prompt includes the following text excerpt from the content item:

15-inch PC Laptop: The ultimate laptop for gaming and productivity. With a 15.6-inch 4K OLED display, a 10th generation i7 processor, and an HD-1650 graphics card, you can enjoy stunning visuals and smooth performance. Plus, with a 1 TB SSD, 16 GB RAM, and a 97 Wh battery, you can store all your files, run multiple applications, and work or play for hours. Order now and get a 10% discount and free shipping.

In response, the generative AI model 240 generates a JSON output of properties and corresponding values that represent the content item in terms normalized by the model. To illustrate, Listing 3 below shows an example content item response in the standardized object format.

```
{
    "product": "15-inch PC Laptop",
    "category": "laptop",
    "attributes": {
        "display": "15.6-inch 4K OLED",
        "processor": "10th generation i7",
        "graphics card": "HD-1650",
```

```
        "storage": "1 TB SSD",
        "memory": "16 GB RAM",
        "battery": "97 Wh"
    }
    "benefits": {
        "gaming and productivity": true,
        "stunning visuals and smooth performance": true,
        "large storage and memory capacity": true,
        "long battery life": true
    }
}
```
Listing 3

As shown, the example JSON object captures the content item's category, attributes, and benefits. In particular, the content category responses unify the different content item descriptions into common, standardized, and normalized keywords, which capture the full semantic meaning of the content item. Additionally, in various implementations, the content retrieval system 210 utilizes the content category responses as feature vectors for the content item.

Act 510 includes the content retrieval system 210 receiving the content category responses for the content items from the generative AI model 240. For example, the content retrieval system 210 receives a single content category response for a single content item based on a single content item prompt. In some instances, the content retrieval system 210 receives a single content category response for multiple content items based on a single content item prompt. In some instances, the content retrieval system 210 receives multiple content category responses for multiple content items based on a single content item prompt.

As mentioned above, FIG. 6 includes additional details about generating matching content pairs based on comparing the query intent responses to content category responses. In particular, FIG. 6 illustrates an example diagram of determining matching content pairs between a user query and content items according to some implementations.

Figure 6:
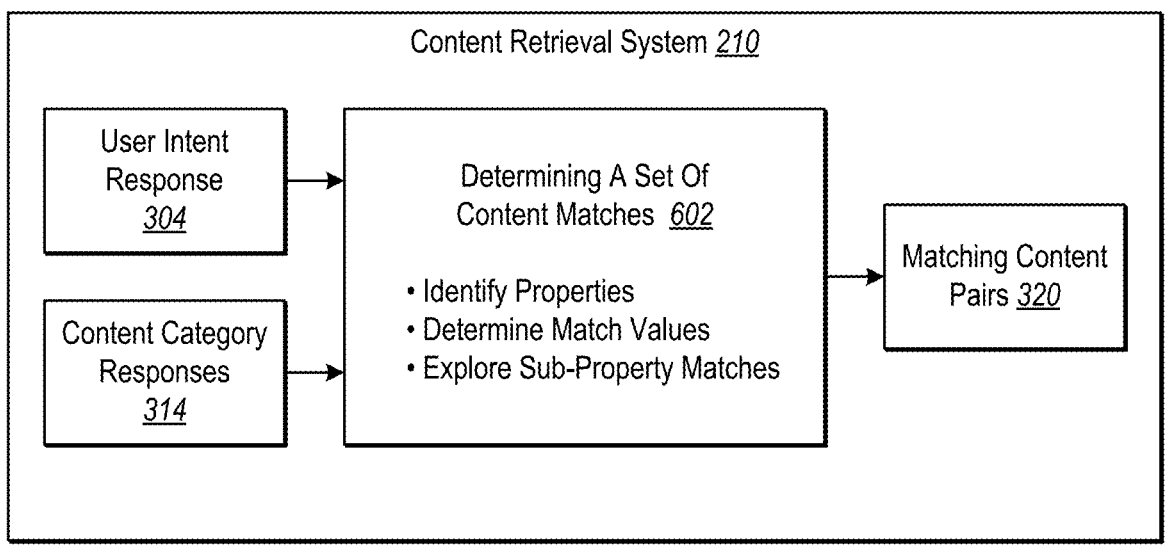
FIG. 6 illustrates an example diagram of determining matching content pairs between a user query and content items.

As shown, FIG. 6 includes the content retrieval system 210 generating the matching content pairs 320 from the user intent response 304 and the content category responses 314, each of which was introduced above. In particular, in the illustrated embodiment, the content retrieval system 210 performs act 602 of determining a set of content matches to generate the matching content pairs 320.

In various implementations, the content retrieval system 210 determines the matching content pairs 320 based on identifying a subset of content items that are loosely related to the user query. For instance, the content retrieval system 210 identifies content items that have a threshold number of matching or correlated attributes and characteristics. In particular, as described below, the content retrieval system 210 determines a correlation between the user query and the content items based on comparing the user intent response 304 with the content category responses 314.

In various implementations, the content retrieval system 210 uses entity matching to quickly and efficiently identify the matching content pairs 320. In particular, the content retrieval system 210 extracts entities from the content category responses 314 and matches them with entities from the content category responses 314. By matching entities from the responses (e.g., the standardized objects), the content retrieval system 210 can significantly reduce the data size typically used to compare user queries to content items to identify the subset of candidate matches (e.g., the matching content pairs 320) before performing a more fine-grained evaluation. Furthermore, the reduced size of standardized objects enables the content retrieval system 210 to quickly and efficiently identify the matching content pairs 320 in real time with minimal computational processing.

To illustrate, act 602 shows that the content retrieval system 210 can determine the matching content pairs 320 by identifying properties (e.g., entities) of the user intent response 304 and the content category responses 314 as well as determine matching values. For instance, the content retrieval system 210 can match the value of the intent property from the user intent response 304 to the values of the category property of the content category responses 314.

To further illustrate, from the above example listings, the content retrieval system 210 identifies the property: value entry of "{"intent": "laptop"}" from the user intent response 304 (e.g., a query intent standardized object). From this, the content retrieval system 210 extracts the value "laptop." Similarly, from the content category response for the given content item (e.g., a content category standardized object), the content retrieval system 210 identifies the property: value entry of "{"category": "laptop"}" and also extracts "laptop." Based on the values matching, the content retrieval system 210 generates a candidate matching pair between the user query and the given content item.

As seen from the above example, the property field in the user intent response differs from the property field in the content category response. In many instances, the property fields will be different while also being complementary. However, while the property field is different, the values match. In some instances, the content retrieval system 210 determines that a content item is loosely related to the user query based on the values being similar. In many instances, however, the values will match as the same or a similar generative AI model using a normalized set of terms generated, the values for each using similar directions and approaches. Indeed, by using the generative AI model in the previous steps to generate the standardized objects, the content retrieval system 210 offloads the complex tasks of determining intent and characterizing data into a standardized format and terminology. This, in turn, allows the content retrieval system 210 to determine matching content pairs 320 at a very high efficiency level.

In various implementations, the content retrieval system 210 matches the values of the intent entity (e.g., the intent property) for the user intent response 304 with some or all of the content category responses 314 to determine the matching content pairs 320. If a threshold number of pairs is found, the content retrieval system 210 may proceed to determine correlation scores for the pairs.

Otherwise, as shown in act 602, the content retrieval system 210 may explore sub-property matches. For example, the content retrieval system 210 extracts values from one or more additional property fields of the user intent response 304 (e.g., sub-intent or preferences) to identify matches. In some instances, the content retrieval system 210 expands the matching process systematically, one or two properties at a time, until the threshold number of pairs is found.

In some implementations, the content retrieval system 210 determines the matching content pairs 320 based on a vector comparison between the user intent response 304 and the content category responses 314. As noted above, the user intent response 304 may serve as a feature vector for the user query, and the content category responses 314 may serve as feature vectors for the content items. In these instances, the content retrieval system 210 may use a feature vector comparison to determine the matching content pairs 320

(e.g., group all content category responses within a threshold distance of the user intent response 304 in vector space).

Figure 7A:
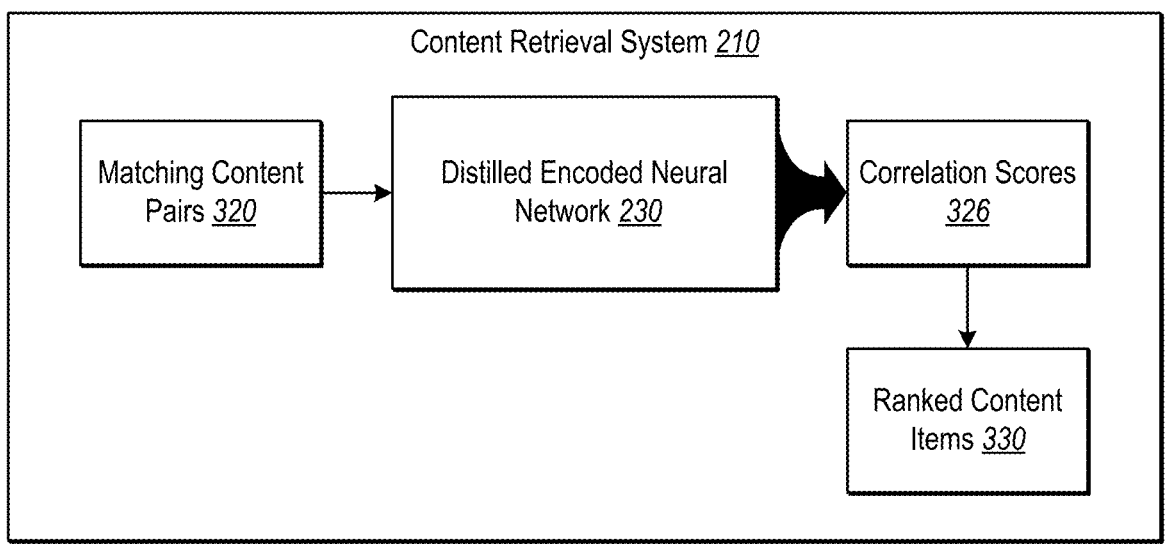
FIGS. 7A and 7B illustrate example diagrams for determining ranked content items using a distilled encoder neural network.
Figure 7B:
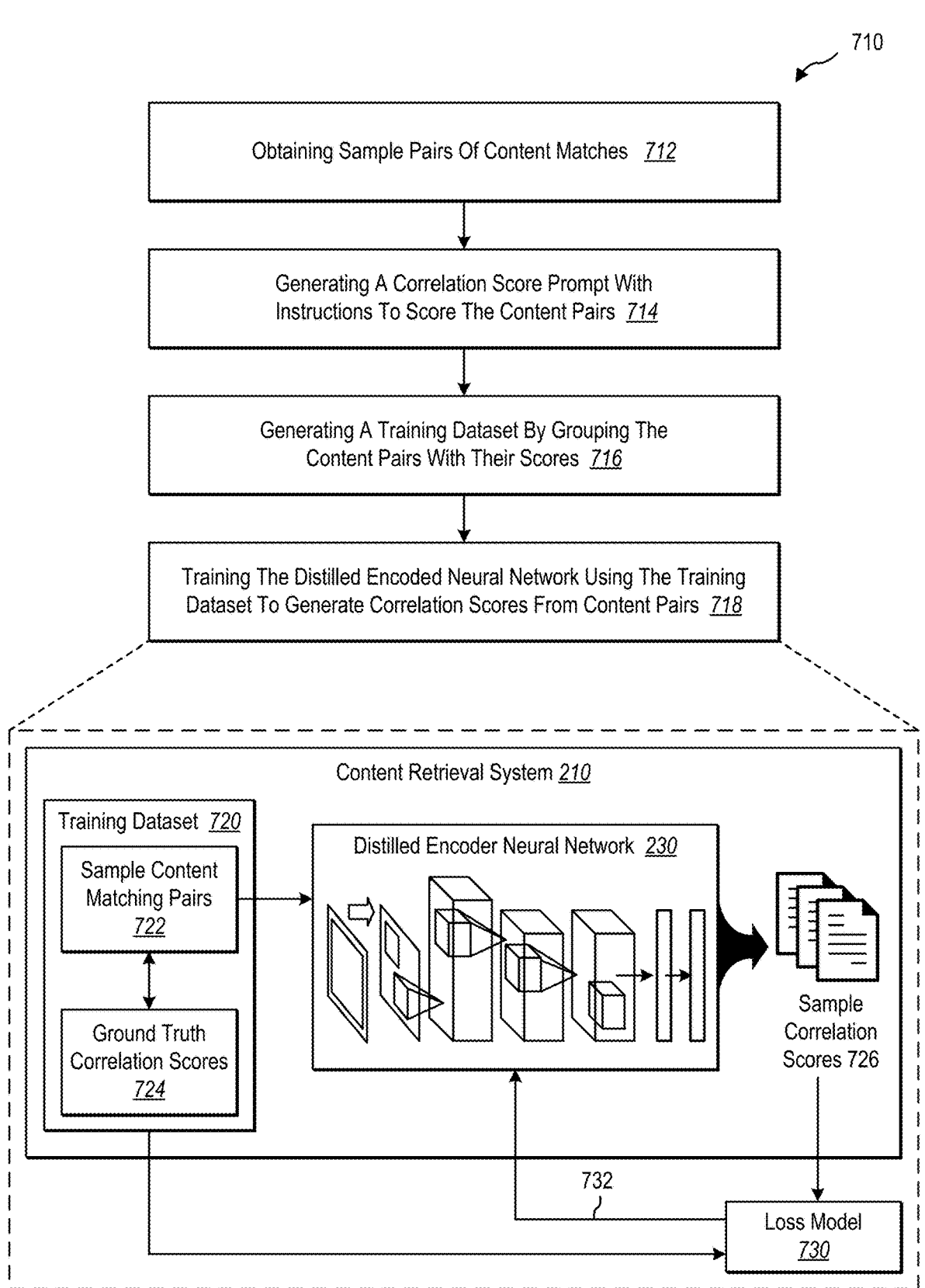

As mentioned above, FIGS. 7A and 7B provide additional details about training and using a distilled encoder neural network to generate correlation scores for matching content pairs. In particular, FIGS. 7A and 7B illustrate example diagrams for determining ranked content items using a distilled encoder neural network according to some implementations. Specifically, FIG. 7A shows a diagram of determining ranked content items, while FIG. 7B shows a hybrid flowchart for training a distilled encoder neural network.

As shown, FIG. 7A shows the content retrieval system 210 with the distilled encoder neural network 230, the matching content pairs 320, the correlation scores 326, and the ranked content items 330, each of which is described above. As noted above, the matching content pairs 320 are generated based on identifying content items that have a loose (e.g., minimum threshold level) correlation with the user query.

As mentioned, the content retrieval system 210 includes the distilled encoder neural network 230. In various implementations, the distilled encoder neural network 230 is a convolutional neural network or another type of neural network that can perform operations. For example, the distilled encoder neural network 230 is a sophisticated encoder neural network used for dense and sparse content item retrieval.

In one or more implementations, the distilled encoder neural network 230 takes in the user query (e.g., the user intent response) and one or more content items (e.g., one or more content category responses) and determines a correlation score between each pair. Because the matching content pairs 320 include only a subset of content items, the distilled encoder neural network 230 is able to quickly score each matching content pair. Additionally, because the distilled encoder neural network is a small machine learning model, it can accurately and efficiently determine the correlation scores 326 for each of the matching content pairs 320 in real time.

As shown, the distilled encoder neural network 230 outputs the correlation scores 326 for the matching content pairs 320. The correlation scores 326 can range from 0-1, 1-10, 1-100, etc. Using the correlation scores 326, the content retrieval system 210 can rank the matching content pairs 320.

Furthermore, the content retrieval system 210 can assign the ranked order from the matching content pairs 320 to corresponding content items to generate the ranked content items 330. For instance, because each matching content pair is based on a content item, the content retrieval system 210 can assign the correlation scores of a pair to the content item within the pair as it relates to the user query.

In some implementations, as provided above, the content retrieval system 210 can select one or more of the top- or highest-ranked content items to retrieve. For instance, using the ranked content items 330, the content retrieval system 210 selects a content item (or content items) to provide to the requesting client device in response to the user query. In this way, the content retrieval system 210 (or another system) retrieves and/or provides a highly relevant content item (or content items) to the client device in real-time in response to the user query.

From the example above, the content retrieval system 210 may determine that the user query with the intent of a laptop best correlates with the given content item of the 15-inch PC Laptop. In particular, the content retrieval system 210 determines that the given content initially matched the user query.

The content retrieval system 210 then uses the distilled encoder neural network 230 to determine a correlation score for the given content item. Based on comparing the correlation score of the given content item to other content items with scores, the content retrieval system 210 determines whether to retrieve and/or provide the given content item to the user in response to the user query.

FIG. 7B corresponds to an example of training the distilled encoder neural network 230 to generate correlation scores 326. As shown, FIG. 7B includes a series of acts 710 performed by or with the content retrieval system 210. FIG. 7B also includes, near the bottom, a training model example corresponding to the series of acts 710.

The series of acts 710 includes act 712 of obtaining sample pairs of content matches. For example, the content retrieval system 210 obtains or generates pairs of content matches from previous user queries. In various implementations, the content retrieval system 210 uses a similar process as described above to generate user intent responses and corresponding content category responses using a generative AI model. Additionally, in some instances, the content retrieval system 210 generates subsets of matching content pairs for each user query, as described above.

Act 714 includes generating a correlation score prompt for the generative AI model to generate a fine-grained matching or correlation score for each content category response. In various implementations, the correlation score prompt also instructs the generative AI model to provide natural language text providing a reason for the correlation score between each user query/content item pair, which may help the generative AI model in generating the correlation score. In various implementations, the content retrieval system 210 generates the correlation scores for the sample content matching pairs offline.

Act 716 includes generating a training dataset by grouping the content pairs with their scores. For example, the content retrieval system 210 generates a training dataset 720 that includes the sample content matching pairs 722 and their correlation scores (e.g., ground truth correlation scores 724).

Act 718 includes training the distilled encoder neural network using the training dataset to generate correlation scores from content pairs. For example, the content retrieval system 210 uses the training data to train the distilled encoder neural network 230 in a supervised manner to identify and classify target entities in a user prompt.

To illustrate, as shown below act 718, the content retrieval system 210 provides the sample content matching pairs 722 from the training dataset 720 to the distilled encoder neural network 230, which generates sample correlation scores 726. The content retrieval system 210 then provides the sample correlation scores 726 to a loss model 730, which compares the sample correlation scores 726 to the ground truth correlation scores 724 to determine an error amount. Furthermore, the content retrieval system 210 provides the error amount as feedback 732 to fine-tune the weights, layers, and/or parameters of the distilled encoder neural network 230. Once trained, the distilled encoder neural network 230 is able to match content pairs and output accurate correlation scores, which may be used to rank and retrieve content items for user queries.

Figure 8:
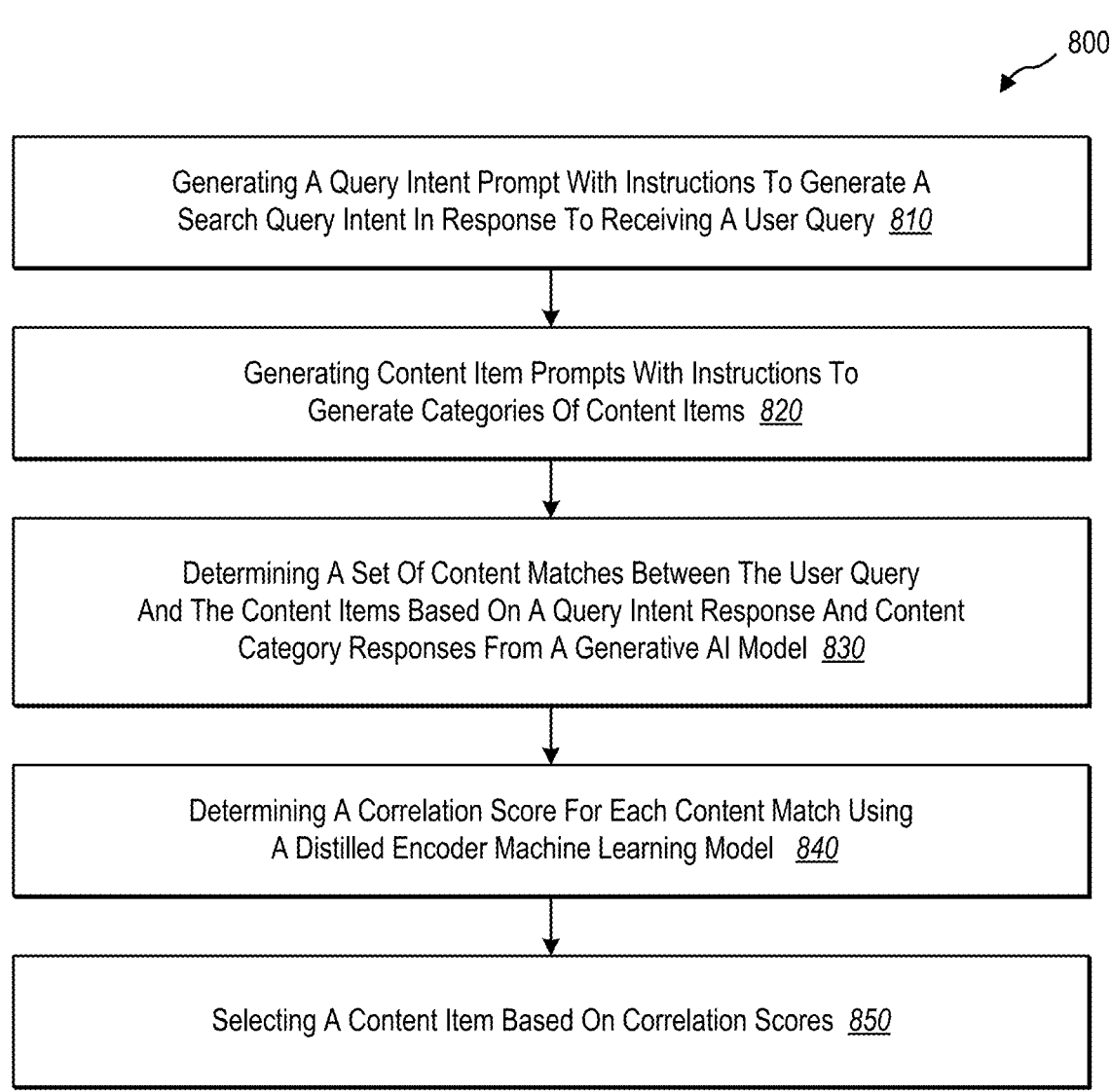
FIG. 8 illustrates an example series of acts in a computer-implemented method for content item retrieval based on one or more generative artificial intelligence (AI) models.

Turning now to FIG. 8, this figure illustrates an example series of acts of a computer-implemented method for content item retrieval based on one or more generative artificial intelligence (AI) models according to some implementations. While FIG. 8 illustrates acts according to one or more implementations, alternative implementations may omit, add to, reorder, exclude, include, rearrange, and/or modify any of the acts shown.

The acts in FIG. 8 can be performed as part of a method (e.g., a computer-implemented method). Alternatively, a computer-readable medium can include instructions that, when executed by a processing system with a processor, cause a computing device to perform the acts in FIG. 8. In some implementations, a system (e.g., a processing system comprising a processor) can perform the acts in FIG. 8. For example, the system includes a processing system and a computer memory including instructions that, when executed by the processing system, cause the system to perform various actions or steps.

As shown, the series of acts 800 includes act 810 of generating a query intent prompt with instructions to generate a search query intent in response to receiving a user query. For instance, in example implementations, act 810 involves generating a query intent prompt with instructions to generate a search query intent based on the user query and user profile information outputted in a standardized object format in response to receiving a user query.

In some implementations, act 810 includes receiving the user query from a client device associated with a user that includes a search request for content. In some implementations, act 810 also includes obtaining the user profile information in connection with receiving the user query. In some instances, the user profile information is associated with a user identifier of the user and includes user attributes, preferences, and characteristics. In some implementations, act 810 includes providing the query intent prompt to the generative AI model, where the instructions in the query intent prompt direct the generative AI model to generate natural language text representative of user intent and user preferences in the standardized object format, and receiving the query intent response from the generative AI model. In some instances, the query intent prompt includes an example of a user query output generated in the standardized object format.

As further shown, the series of acts 800 includes act 820 of generating content item prompts with instructions to generate categories of content items. For instance, in example implementations, act 820 involves generating one or more content item prompts with instructions to generate categories of content items outputted in the standardized object format.

In some implementations, a content item prompt includes a link to a given content item, content associated with the given content item, and metadata associated with the given content item. In some implementations, act 820 includes identifying a set of content items that correspond to webpages and providing links to and content from the webpages within the one or more content item prompts. In some implementations, act 820 includes providing the one or more content item prompts to the generative AI model, and receiving the one or more content category responses from the generative AI model. In various implementations, the instructions in the one or more content item prompts direct the generative AI model to generate natural language text representative of content item category and content item attributes in the standardized object format, and where a content item prompt of the one or more content item prompts includes an example of a content item output generated in the standardized object format. In some implementations, the generative AI model is the same model used to generate user query outputs.

As further shown, the series of acts 800 includes act 830 of determining a set of content matches between the user query and the content items based on a query intent response and content category responses from a generative AI model. For instance, in example implementations, act 830 involves determining a set of content matches between the user query and the content items based on receiving a query intent response for the query intent prompt from a generative AI model and receiving one or more content category responses for the one or more content item prompts from the generative AI model.

In one or more implementations, act 830 includes determining a set of content matches between the query intent response and content items with attributes and features formatted in the standardized object format based on receiving a query intent response for the query intent prompt from a generative AI model. In some instances, the standardized object format is a JSON object file with properties and values, a first JSON object file generated for the user query includes a first property with a first value, and a second JSON object file generated for one or more content items of the content items includes a second property with the same first value, but the first property is different from the second property.

In various implementations, determining the set of content matches includes comparing the first value of a first property in the query intent response with a second value of the second property in the one or more content category responses, where the first value and the second value match. In some implementations, the first property in the query intent response is different from the second property in the one or more content category responses. In some implementations, the generative AI model is a small action generative AI model trained to standardize input tokens and generate output tokens in the standardized object format.

As further shown, the series of acts 800 includes act 840 of determining a correlation score for each content match using a distilled encoder machine learning model. For instance, in example implementations, act 840 involves determining a correlation score for each content match in the set of content matches using a distilled encoder neural network.

In some implementations, the distilled encoder neural network determines correlation scores for content matches between user query responses in the standardized object format and content category responses in the standardized object format. In some implementations, act 840 includes utilizing the generative AI model to train the distilled encoder neural network to generate the correlation scores. In some implementations, act 840 includes training the distilled encoder neural network by providing content matching pairs to the generative AI model with instructions to generate correlation scores for each content matching pair, generating a training dataset with the content matching pairs and corresponding correlation scores, and training the distilled encoder neural network in a supervised manner using the training dataset.

As further shown, the series of acts 800 includes act 850 of selecting a content item based on correlation scores. For instance, in example implementations, act 850 involves selecting a content item from the content items based on correlation scores. In some implementations, act 850 includes determining the content item by ranking the content items based on correlation scores and selecting the content item based on the content item having the highest correlation score. In some instances, act 850 includes retrieving the content item from the content items to provide to a client device associated with a user in response to the user query.

Figure 9:
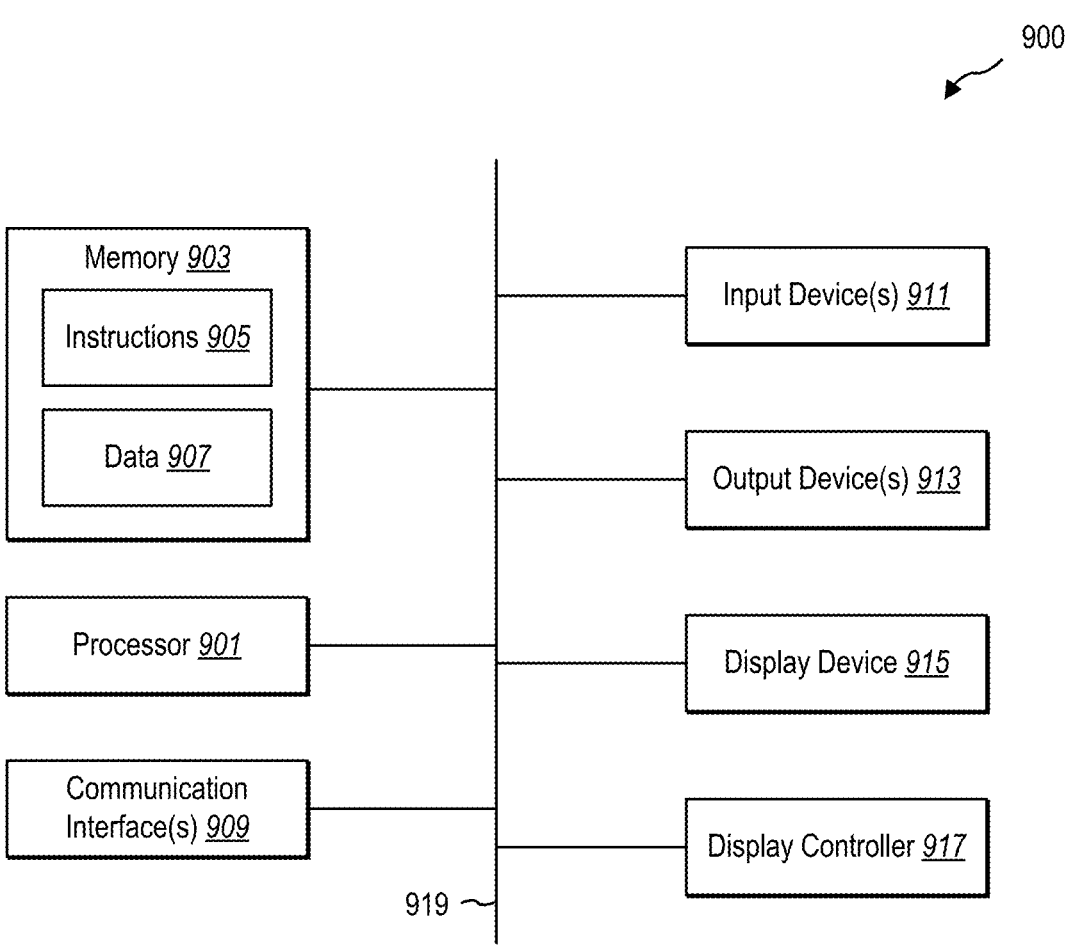
FIG. 9 illustrates example components included within a computer system that implements the content retrieval system.

FIG. 9 illustrates certain components that may be included within a computer system 900. The computer system 900 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 900 represents one or more of the client devices, server devices, or other computing devices described above. For example, the computer system 900 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processing system including a processor 901. The processor 901 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 901 may be referred to as a central processing unit (CPU) and may cause computer-implemented instructions to be performed. Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 stored in the memory 903. Any of the various examples of modules and components described herein may be implemented, partially or wholly, as instructions 905 stored in memory 903 and executed by the processor 901. Any of the various examples of data described herein may be among the data 907 stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface(s) 909 include a Universal Serial Bus (USB), an Ethernet adapter, a wireless adapter that operates according to an Institute of Electrical and Electronics Engineers (IEEE) 802.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided to convert data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For clarity, the various buses are illustrated in FIG. 9 as a bus system 919.

This disclosure describes a subjective data application system within the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry the required program code in the form of computer-executable instructions or data structures, which can be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or another data link that enables the transportation of electronic data between respective client devices and components (e.g., server devices and/or virtual machines thereon) of the cloud computing system.

Furthermore, upon reaching various computer system components, program code means in the form of computer-executable instructions or data structures can be automatically transferred from transmission media to non-transitory computer-readable storage media (devices), or vice versa. For example, computer-executable instructions or data structures received over a network or data link can be buffered in random-access memory (RAM) within a network interface module (NIC) and then eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, handheld devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available medium that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage, or other magnetic storage devices, or any other medium that can be used to store desired program code means in the form of computer-executable instructions or data structures and that can be accessed by a general-purpose or special-purpose computer.

The steps and/or actions of the methods described herein may be interchanged with one another without departing from the scope of the claims. In other words, unless a specific order of steps or actions is required for the proper operation of the method being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for performing content item retrieval based on one or more generative artificial intelligence (AI) models, comprising:
    in response to receiving a user query, generating a query intent prompt with instructions to generate a search query intent based on the user query and user profile information outputted in a standardized object format;
    generating one or more content item prompts with instructions to generate categories of content items outputted in the standardized object format;
    based on receiving a query intent response for the query intent prompt from a generative AI model and receiving one or more content category responses for the one or more content item prompts from the generative AI model, determining a set of content matches between the user query and the content items;
    determining a correlation score for each content match in the set of content matches using a distilled encoder neural network; and
    selecting a content item from the content items based on correlation scores.

2. The computer-implemented method of claim 1, further comprising receiving the user query from a client device associated with a user that includes a search request for content.

3. The computer-implemented method of claim 2, further comprising obtaining the user profile information in connection with receiving the user query, wherein the user profile information is associated with a user identifier of the user and includes user attributes, preferences, and characteristics.

4. The computer-implemented method of claim 1, further comprising:
    providing the query intent prompt to the generative AI model, wherein the instructions in the query intent prompt direct the generative AI model to generate natural language text representative of user intent and user preferences in the standardized object format, and wherein the query intent prompt includes an example of a user query output generated in the standardized object format; and
    receiving the query intent response from the generative AI model.

5. The computer-implemented method of claim 1, wherein a content item prompt includes a link to a given content item, content associated with the given content item, and metadata associated with the given content item.

6. The computer-implemented method of claim 1, further comprising:
    identifying a set of content items that correspond to webpages; and
    providing links to and content from the webpages within the one or more content item prompts.

7. The computer-implemented method of claim 1, further comprising:
    providing the one or more content item prompts to the generative AI model, wherein the instructions in the one or more content item prompts direct the generative AI model to generate natural language text representative of content item category and content item attributes in the standardized object format, and wherein a content item prompt of the one or more content item prompts includes an example of a content item output generated in the standardized object format; and
    receiving the one or more content category responses from the generative AI model, wherein the generative AI model is a same model used to generate user query outputs.

8. The computer-implemented method of claim 1, wherein:
    the standardized object format is a JSON object file with properties and values;
        a first JSON object file generated for the user query includes a first property with a first value; and
        a second JSON object file generated for one or more content items of the content items includes a second property with the first value, the first property being different from the second property.

9. The computer-implemented method of claim 1, wherein determining the set of content matches includes comparing a first value of a first property in the query intent response with a second value of a second property in the one or more content category responses, wherein the first value matches and the second value.

10. The computer-implemented method of claim 1, wherein the generative AI model is a small action generative AI model trained to standardize input tokens and generate output tokens in the standardized object format.

11. The computer-implemented method of claim 1, wherein the distilled encoder neural network determines correlation scores for content matches between user query responses in the standardized object format and content category responses in the standardized object format.

12. The computer-implemented method of claim 11, further comprising utilizing the generative AI model to train the distilled encoder neural network to generate the correlation scores.

13. The computer-implemented method of claim 1, further comprising training the distilled encoder neural network by:

providing content matching pairs to the generative AI model with instructions to generate correlation scores for each content matching pair;

generating a training dataset with the content matching pairs and corresponding correlation scores; and training the distilled encoder neural network in a supervised manner using the training dataset.

14. The computer-implemented method of claim 1, further comprising:

determining the content item by ranking the content items based on correlation scores; and selecting the content item based on the content item having a highest correlation score.

15. The computer-implemented method of claim 1, further comprising retrieving the content item from the content items to provide to a client device associated with a user in response to the user query.

16. A system comprising:

a processing system having a processor; and a computer memory including instructions that, when executed by the processing system, cause the system to carry out operations comprising:

in response to receiving a user query, generating a query intent prompt with instructions to generate a search query intent based on the user query and user profile information outputted in a standardized object format;

generating one or more content item prompts with instructions to generate categories of content items outputted in the standardized object format;

based on receiving a query intent response for the query intent prompt from a generative AI model and receiving one or more content category responses for the one or more content item prompts from the generative AI model, determining a set of content matches between the user query and the content items;

determining a correlation score for each content match in the set of content matches using a distilled encoder neural network; and selecting a content item from the content items based on correlation scores.

17. The system of claim 16, further comprising:

generating one or more content item prompts with instructions to generate categories of content items outputted in the standardized object format;

providing the one or more content item prompts to the generative AI model; and receiving the one or more content category responses in the standardized object format from the generative AI model.

18. A non-transitory computer-readable storage medium for performing content item retrieval based on one or more generative artificial intelligence (AI) models, comprising instructions that, when executed by a processor, cause a computing device to carry out operations comprising:

in response to receiving a user query, generating a query intent prompt with instructions to generate a search query intent based on the user query and user profile information outputted in a standardized object format;

generating one or more content item prompts with instructions to generate categories of content items outputted in the standardized object format;

based on receiving a query intent response for the query intent prompt from a generative AI model and receiving one or more content category responses for the one or more content item prompts from the generative AI model, determining a set of content matches between the user query and the content items;

determining a correlation score for each content match in the set of content matches using a distilled encoder neural network; and selecting a content item from the content items based on correlation scores.

19. The non-transitory computer-readable storage medium of claim 18, wherein determining the set of content matches includes comparing a first value of a first property in the query intent response with a second value of a second property in the one or more content category responses, wherein the first value matches the second value.

20. The non-transitory computer-readable storage medium of claim 19, wherein the first property in the query intent response is different from the second property in the one or more content category responses.

* * * * *